(12) United States Patent
Serrano et al.

(10) Patent No.: US 11,928,585 B2
(45) Date of Patent: Mar. 12, 2024

(54) NEURAL NETWORK ARCHITECTURE FOR SMALL LIDAR PROCESSING NETWORKS FOR SLOPE ESTIMATION AND GROUND PLANE SEGMENTATION

(71) Applicant: HRL Laboratories, LLC, Malibu, CA (US)

(72) Inventors: Christopher Serrano, Whittier, CA (US); Michael A. Warren, Northridge, CA (US); Aleksey Nogin, Fresno, CA (US)

(73) Assignee: HRL LABORATORIES, LLC, Malibu, CA (US)

(*) Notice: Subject to any disclaimer, the term of this patent is extended or adjusted under 35 U.S.C. 154(b) by 258 days.

(21) Appl. No.: 16/950,803

(22) Filed: Nov. 17, 2020

(65) Prior Publication Data
US 2021/0278854 A1 Sep. 9, 2021

Related U.S. Application Data

(60) Provisional application No. 62/984,676, filed on Mar. 3, 2020, provisional application No. 62/984,693, filed on Mar. 3, 2020.

(51) Int. Cl.
*G06N 3/08* (2023.01)
*B60W 60/00* (2020.01)
(Continued)

(52) U.S. Cl.
CPC .............. *G06N 3/08* (2013.01); *G05D 1/0221* (2013.01); *G05D 1/0276* (2013.01);
(Continued)

(58) Field of Classification Search
CPC ...... G06N 3/08; G05D 1/0221; G05D 1/0276; B60W 2556/45; B60W 60/001; G06F 7/544
See application file for complete search history.

(56) References Cited

U.S. PATENT DOCUMENTS 10,108,867 B1 * 10/2018 Vallespi-Gonzalez ..................... G06V 10/955
10,372,142 B2 * 8/2019 Venturelli ............. B64C 39/024
(Continued)

FOREIGN PATENT DOCUMENTS

JP 2013142980 A1 * 10/2012 ............... G06T 7/20

OTHER PUBLICATIONS

Translation of JP2013142980A1 (Year: 2012).*
(Continued)

*Primary Examiner* — Kenneth J Malkowski
*Assistant Examiner* — Carville Albert Hollingsworth, IV
(74) *Attorney, Agent, or Firm* — TOPE-MCKAY & ASSOCIATES

(57) ABSTRACT

Described is a system for training a neural network for estimating surface normals for use in operating an autonomous platform. The system uses a parallelizable k-nearest neighbor sorting algorithm to provide a patch of points, sampled from the point cloud data, as input to the neural network model. The points are transformed from Euclidean coordinates in a Euclidean space to spherical coordinates. A polar angle of a surface normal of the point cloud data is estimated in the spherical coordinates. The trained neural network model is utilized on the autonomous platform, and the estimate of the polar angle of the surface normal is used to guide operation of the autonomous platform within the environment.

15 Claims, 6 Drawing Sheets

(51) Int. Cl.
  *G05D 1/00*  (2006.01)
  *G05D 1/02*  (2020.01)
  *G06F 7/544* (2006.01)
(52) U.S. Cl.
  CPC ....... *B60W 60/001* (2020.02); *B60W 2556/45* (2020.02); *G06F 7/544* (2013.01)

(56) References Cited

U.S. PATENT DOCUMENTS

| | | | | |
|---|---|---|---|---|
| 2011/0295569 | A1* | 12/2011 | Hamke | G01P 7/00 |
| | | | | 703/2 |
| 2018/0096229 | A1* | 4/2018 | Bronstein | G06N 3/0481 |
| 2018/0165821 | A1* | 6/2018 | Nezamabadi | G06T 7/60 |
| 2019/0179027 | A1* | 6/2019 | England | G01S 7/4817 |
| 2021/0370968 | A1* | 12/2021 | Xiao | G06T 17/05 |

OTHER PUBLICATIONS

The International Search Report of the International Searching Authority for PCT/US2020/060924; dated Aug. 24, 2021.
The the Written Opinion of the International Searching Authority for PCT/US2020/060924; dated Aug. 24, 2021.
Komarichev, Artem, et al: "A-CNN: Annularly Convolutional Neural Networks on Point Clouds," 2019 IEEE/CVF Conference on Computer Vision and Pattern Recognition (CVPR), IEEE, Jun. 15, 2019, (Jun. 15, 2019), pp. 7413-7422.
Xie Saining, et al: "Attentional ShapeContextNet for Point Cloud Recognition," 2018 IEEE/CVF Conference on Computer Vision and Pattern Recognition, IEEE, Jun. 18, 2018 (Jun. 18, 2018), pp. 4606-4615.
Adrien Poulenard, et al: "Multi-directional geodesic neural networks via equivariant convolution," Dec. 4, 2018; Dec. 4-Dec. 7, 2018, Dec. 4, 2018 (Dec. 4, 2018), pp. 1-14.
Guerrero, P., Kleiman, Y., Ovsjanikov, M., & Mitra, N. J. (2018). PCPNet: Learning local shape properties from raw point clouds. Computer Graphics Forum, pp. 75-85.
Andola, F. N. (2016). SqueezeNet: AlexNet-level accuracy with 50x fewer parameters and< 0.5 MB model size. arXiv preprint arXiv:1602.07360, pp. 1-13.
Qi, C. R., Su, H., Mo, K., & Guibas, L. J. (2017). PointNet: Deep learning on point sets for 3D classification and segmentation. The IEEE Conference on Computer Vision and Pattern Recognition (CVPR), pp. 77-85.
Rusu, R. B. (2009). Semantic 3D Object Maps for Everyday Manipulation in Human Living Environments. Muenchen, Germany: Computer Science department, Technische Universitaet, pp. 345-348.
Wang, Y. S. (2018). Pointseg: Real-time semantic segmentation based on 3d LIDAR point cloud. arXiv preprint arXiv:1807.06288, pp. 1-7.
Barrett, C., Stump, A., & Tinelli, C. (2010). The SMT-LIB Standard—Version 2.0. SMT. Edinburgh, pp. 1-12.
Cao, Y., et al. (2019). Adversarial Sensor Attack on LiDAR-based Perception in Autonomous Driving. ACM Conference on Computer and Communications Security, CCS '19, Nov. 11-15, 2019, London, United Kingdom, pp. 2267-2281.
Gao, S., Kong, S., & Clarke, E. M. (2013). "dReal: An SMT Solver for Nonlinear Theories over the Reals?" Carnegie Mellon University, Pittsburgh, PA 15213, CADE, pp. 1-6.
Goodfellow, I., Shlens, J., & Szegedy, C. (2015). Explaining and harnessing adversarial examples. ICLR, pp. 1-11.
Guerrero, P., Kleiman, Y., Ovsjanikov, M., & Mitra, N. J. (2018). PCPNet: Learning local shape properties from raw point clouds. Computer Graphics Forum, vol. 37 (2018), No. 2, pp. 75-85.
Katz, G., Barrett, C. W., Dill, D. L., Julian, K., & Kochenderfer, M. J. (2017). Reluplex: An efficient SMT solver for verifying deep neural networks. CAV, (pp. 97-117).
Wong, E., & Kolter, J. Z. (2018). Provable defenses against adversarial examples via the convex outer adversarial polytope. ICML, pp. 1-10.
Notification of the International Preliminary Report on Patentability Chapter I for PCT/US2020/060924; dated Sep. 15, 2022.
The International Preliminary Report on Patentability Chapter I for PCT/US2020/060924; dated Sep. 15, 2022.
Communication pursuant to Rules 161 (2) and 162 EPC for European Regional Phase Patent Application No. 209 00721.0, dated Oct. 11, 2022.
Response to the communication pursuant to Rules 161(2) and 162 EPC and Reply to Written opinion for European Regional Phase Patent Application No. 20900721.0, dated Apr. 21, 2023.

* cited by examiner

NEURAL NETWORK ARCHITECTURE FOR SMALL LIDAR PROCESSING NETWORKS FOR SLOPE ESTIMATION AND GROUND PLANE SEGMENTATION

GOVERNMENT LICENSE RIGHTS

This invention was made with government support under U.S. Government Contract Number FA8750-18-C-0092. The government may have certain rights in the invention.

CROSS-REFERENCE TO RELATED APPLICATIONS

This is a Non-Provisional Application of U.S. Provisional Patent Application No. 62/984,676, filed Mar. 3, 2020, entitled, "A Neural Network Architecture for Small Lidar Processing Networks for Slope Estimation and Ground Plane Segmentation", the entirety of which is incorporated herein by reference.

This is also a Non-Provisional Application of U.S. Provisional Patent Application No. 62/984,693, filed Mar. 3, 2020, entitled, "An Automatic Procedure for Either Proving or Identifying Counter-Examples to Correctness Properties for Neural Network Based Slope Estimation and Ground Plane Segmentation Systems that Process Point Cloud Data," the entirety of which is incorporated herein by reference.

BACKGROUND OF INVENTION

(1) Field of Invention

The present invention relates to a system for training a neural network for estimating surface normals and, more particularly, to a system for training a neural network for estimating surface normals for use in operating an autonomous platform.

(2) Description of Related Art

Extracting salient information from sensor input in real time has become a motivating force for the development of new neural network models as autonomous systems continue to expand into new and ever more complex environments. Point clouds (e.g., those generated by LIDAR and stereo camera sensors) provide a dense stream of three-dimensional information of the world around an autonomous system (e.g., an autonomous vehicle or drone) from which one wishes to efficiently infer information relevant to decision making (e.g., surface normals and object segmentation) for the safe and successful operation of the autonomous system. However, the processing of these point clouds to extract this information with traditional analytic methods (see Literature Reference No. 4 of the List of Incorporated References) have proven to be both not robust to the noisy data provided by real world sensors and too computationally complex to be applied in real time.

Neural network models have proven to perform better with noisy point cloud data (see Literature Reference No. 3) and have been successfully applied to the estimation of surface normal (see Literature Reference No. 1); however, they continue to be computationally expensive as they contain on the order of 1 million (M) to 15 million (M) parameters. Neural network models of this size require dedicated graphics processing units (GPUs) with notoriously high cost, power, and cooling requirements to operate in real time on an autonomous system. This makes the existing neural network models unsuitable for both low power and thermally constrained applications, such as in autonomous drones and autonomous underwater vehicles. Additionally, for safety critical applications, where it is desired to be able to provide some kind of formal verification of correctness, large networks cannot currently be readily verified by the current state-of-the-art techniques for formal verification of neural networks.

The closest prior art for estimation of surface normals includes a neural network model with 3.5M parameters, which consumes local patches of points from point clouds (see Literature Reference No. 1). The prior art for point cloud segmentation involves a neural network model with 3.5M parameters, which consume an entire point cloud (see Literature Reference No. 3), and a neural network model with 1.5M parameters, which consumes an entire point cloud (see Literature Reference No. 5) that is first transformed to a spherical image. The work of Literature Reference No. 5 is specifically concerned with surpassing the performance of Literature Reference No. 3, which they note struggles in outdoor environments, and solving the task with a smaller model to improve the speed of computation and reduce the resources required to deploy such a system on an autonomous platform.

Thus, a continuing need exists for a system and method for estimation of surface normals for low power applications, which provides point cloud segmentation and performs well in outdoor environments.

SUMMARY OF INVENTION

The present invention relates to a system for training a neural network for estimating surface normals and, more particularly, to a system for training a neural network for estimating surface normals for use in operating an autonomous platform. The system comprises a sensor generating point cloud data and one or more processors and a non-transitory computer-readable medium having executable instructions encoded thereon such that when executed, the one or more processors perform multiple operations. The system trains a neural network model, wherein training the neural network model comprises using a parallelizable k-nearest neighbor sorting algorithm to provide a patch of points sampled from the point cloud data as input to the neural network model, wherein the patch has a central point. The points are transformed from Euclidean coordinates in a Euclidean space to spherical coordinates. A polar angle of a surface normal of the point cloud data is estimated in the spherical coordinates. The trained neural network model is utilized on the autonomous platform. The estimate of the polar angle of the surface normal is used to guide the autonomous platform within the environment.

In another aspect, an azimuthal angle of the surface normal is estimated in the spherical coordinates.

In another aspect, the system extracts an angular and distance relationship between points in the patch and the central point, and provides the angular and distance relationship as input to the neural network model.

In another aspect, the neural network model is used to estimate slopes of the point cloud data.

In another aspect, the neural network model is used to estimate whether the point cloud data corresponds to ground data or non-ground data.

In another aspect, the autonomous platform is an autonomous ground vehicle, and wherein operating the autonomous ground vehicle within the environment comprises controlling a vehicle component of the autonomous ground vehicle.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
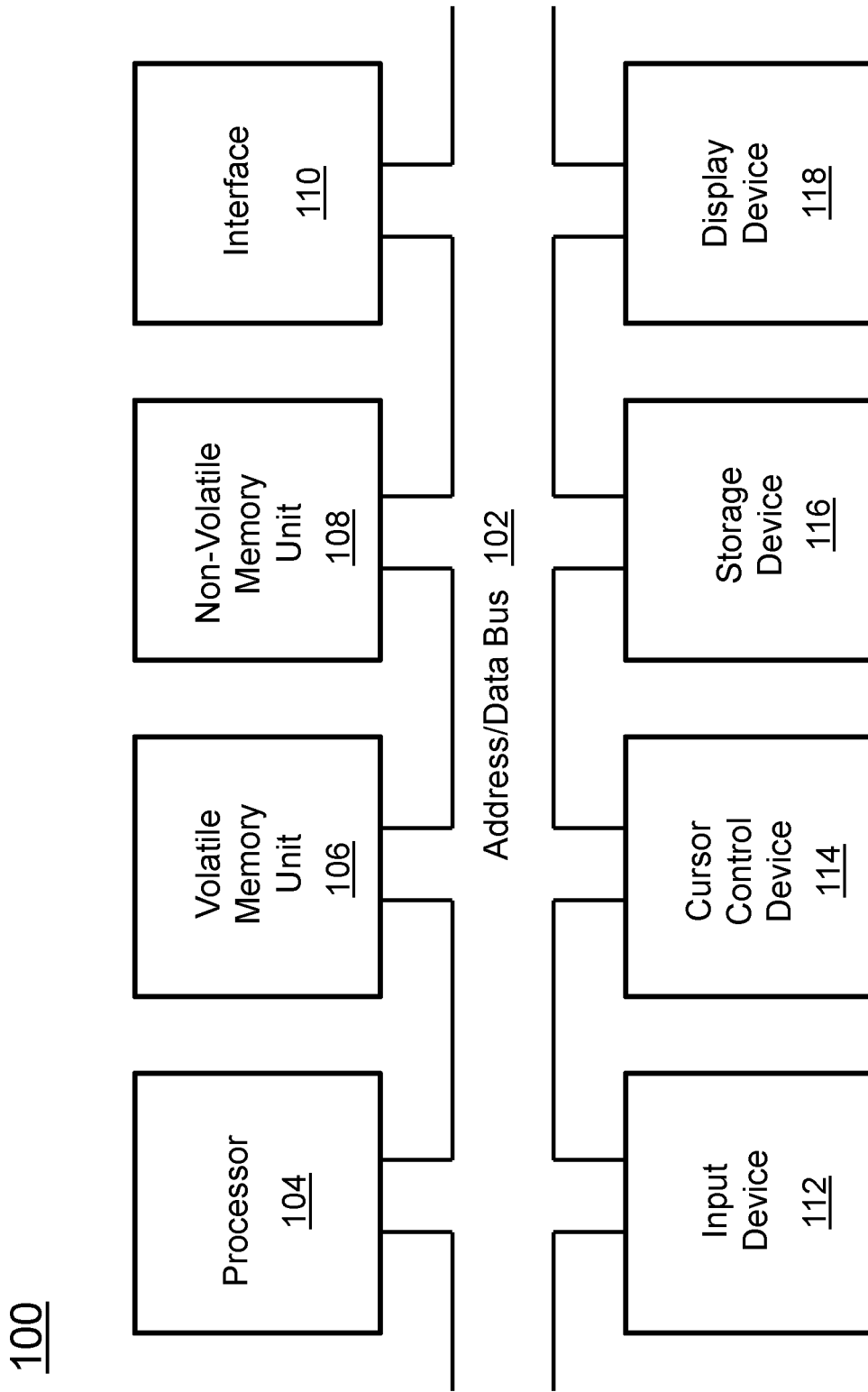
FIG. 1 is a block diagram depicting the components of a system for training a neural network for estimating surface normals according to some embodiments of the present disclosure.

The present invention relates to a system for training a neural network for estimating surface normals and, more particularly, to a system for training a neural network for estimating surface normals for use in operating an autonomous platform. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Guerrero, P., Kleiman, Y., Ovsjanikov, M., & Mitra, N. J. (2018). PCPNet: Learning local shape properties from raw point clouds. Computer Graphics Forum, 75-85.
2. Iandola, F. N. (2016). SqueezeNet: AlexNet-level accuracy with 50× fewer parameters and <0.5 MB model size. arXiv preprint arXiv:1602.07360.
3. Qi, C. R., Su, H., Mo, K., & Guibas, L. J. (2017). PointNet: Deep learning on point sets for 3D classification and segmentation. The IEEE Conference on Computer Vision and Pattern Recognition (CVPR).
4. Rusu, R. B. (2009). Semantic 3D Object Maps for Everyday Manipulation in Human Living Environments. Muenchen, Germany: Computer Science department, Technische Universitaet.
5. Wang, Y. S. (2018). Pointseg: Real-time semantic segmentation based on 3d LIDAR point cloud. arXiv preprint arXiv:1807.06288.

(2) PRINCIPAL ASPECTS

Various embodiments of the invention include three "principal" aspects. The first is a system for training a neural network for estimating surface normals. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within one or more computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology. Further, one or more processors 104 (or devices, such as autonomous platforms) can be associated with one or more associated memories, where each associated memory is a non-transitory computer-readable medium. Each associated memory can be associated with a single processor 104 (or device), or a network of interacting processors 104 (or devices), such as a network of autonomous platforms (e.g., autonomous vehicles, robots).

In one aspect, the computer system 100 may include an input device 112 coupled with the address/data bus 102, wherein the input device 112 (e.g., LIDAR sensor) is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
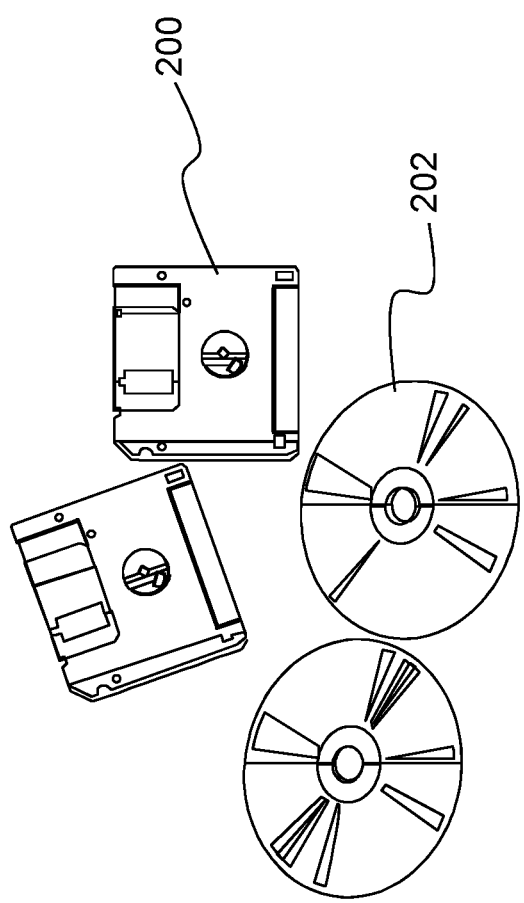
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS

Described is a system involving a pre-processing pipeline and a learned neural network model, which (1) estimates a surface normal vector in three dimensional Euclidian space given three-dimensional point cloud data; (2) estimates whether the point cloud input points constitute ground (roughly flat) or non-ground plane; and accomplishes (1) and (2) with a neural network model of approximately 10 thousand (k) parameters (i.e., learned weights of the neural network (e.g., LIDAR processing neural network)) with six input points (i.e., points in space samples from a LIDAR point cloud) as compared to the current state-of-the-art (see Literature Reference No. 1) of 3.5 million (M) parameters and 500 input points, allowing the invention to be applied to low power applications, thermally constrained applications, low cost applications, applications which lack a graphic processing unit (GPU), and applications where formal verification is required. The learned network model is then utilized to efficiently infer information relevant to decision making (e.g., surface normals and object segmentation) for the safe and successful operation of an autonomous platform in an environment from which the three-dimensional point cloud data is taken. Non-limiting examples of autonomous platforms include autonomous land-based vehicles, autonomous drones, robots, and autonomous underwater vehicles.

Prior art has been concerned with the construction of models that accept sets of points, in the form of point clouds or in local patches from point clouds, or transformations on sets of points, such that the neural network model is permutation invariant with respect to the input. That is, the output of the neural network model will be unchanged on a given set of points regardless of the order of the points in the set. This focus has meant that these approaches have necessarily had to rely on computationally expensive convolutional layers in their neural network architectures to construct intermediary features on local patches of points.

In contrast, the present invention provides a marked improvement over the prior art by utilizing three strategies to eliminate the need for convolutional layers entirely. First, parallelizable k-nearest neighbor sorting algorithms provide local patches of points sorted by their distance to a central point as input to the neural network model described herein, eliminating the need to develop a permutation invariant (with respect to the input) neural network architecture. Second, the points from their Euclidean space x-, y-, and z-coordinate representations are transformed to spherical coordinates in terms of $(r, \varphi, \theta)$ with $\varphi$ the azimuthal angle and $\theta$ the polar angle. Third, the task of estimating the surface normal from that of a $(x, y, z)$ vector in Euclidean space is transformed to that of estimating the azimuthal angle and polar angle, or simply the polar angle $\theta$, of the surface normal in spherical space.

By encoding more information into the input representation (i.e., the explicit relationship between all points and a central point and their sorted order as described below) and reducing the information in the output representation to only that which is necessary (i.e., assuming a surface normal magnitude of 1), the invention described herein is able to utilize very small dense neural networks, on the order of 10k and 5k parameters, to accomplish the same task as prior art. Further, PointNet (see Literature Reference No. 3) and PCPNet (see Literature Reference No. 1), each on the order of 3.5 M parameters, demonstrated their approach on synthetic volumetric data (and 1 meter (m) voxels of three-dimensional room scans), where points may be arbitrarily sampled from a surfel (surface element) with point cloud input sets of 4096 and 500 points, respectively. ThetaNet (an embodiment of the invention), with only 10k parameters, operated on inputs of 6 points to provide comparable performance to PCPNet on the constrained ground-plane segmentation task, as will be described in detail below.

The present invention will allow for the application of neural network models which carry out tasks (1) and (2) above to low power, low cost, or thermally constrained applications, as well as applications that require formal verification. The invention described herein transforms the task of surface normal estimation to an estimation of either the polar angle ($\theta$ in spherical coordinates) and azimuthal angle ($\varphi$ in spherical coordinates), or more simply only the polar angle $\theta$, of the surface normal of the central point of a patch. This transformation unburdens the neural network from learning the magnitude of the surface normal, which is both irrelevant to the task and assumed to be unity by definition, allowing reduction in the size of the neural network required to accomplish the task. Current state-of-the art approaches require the processing power of GPUs to run the neural network models in real time, thus limiting their application to those systems that can support the high cost, power, and thermal loads of a GPU.

Further, current state-of-the-art approaches have been demonstrated on point cloud data generated by three-dimensional models and room scans which provide a surfel from which an arbitrary number of points may be sampled. In contrast, real world tasks involve noisy LIDAR point cloud data biased by the number, and orientation of, 'rings' on a given LIDAR sensor on which the current approach of Literature Reference No. 3 is known to struggle. Experimental studies of the invention of the present disclosure demonstrated that the invention performs well on noisy point cloud data, where prior art struggles, and is able to transfer between varying vehicle platforms and LIDAR sensors without necessitating retraining of the neural network model.

Figure 3:
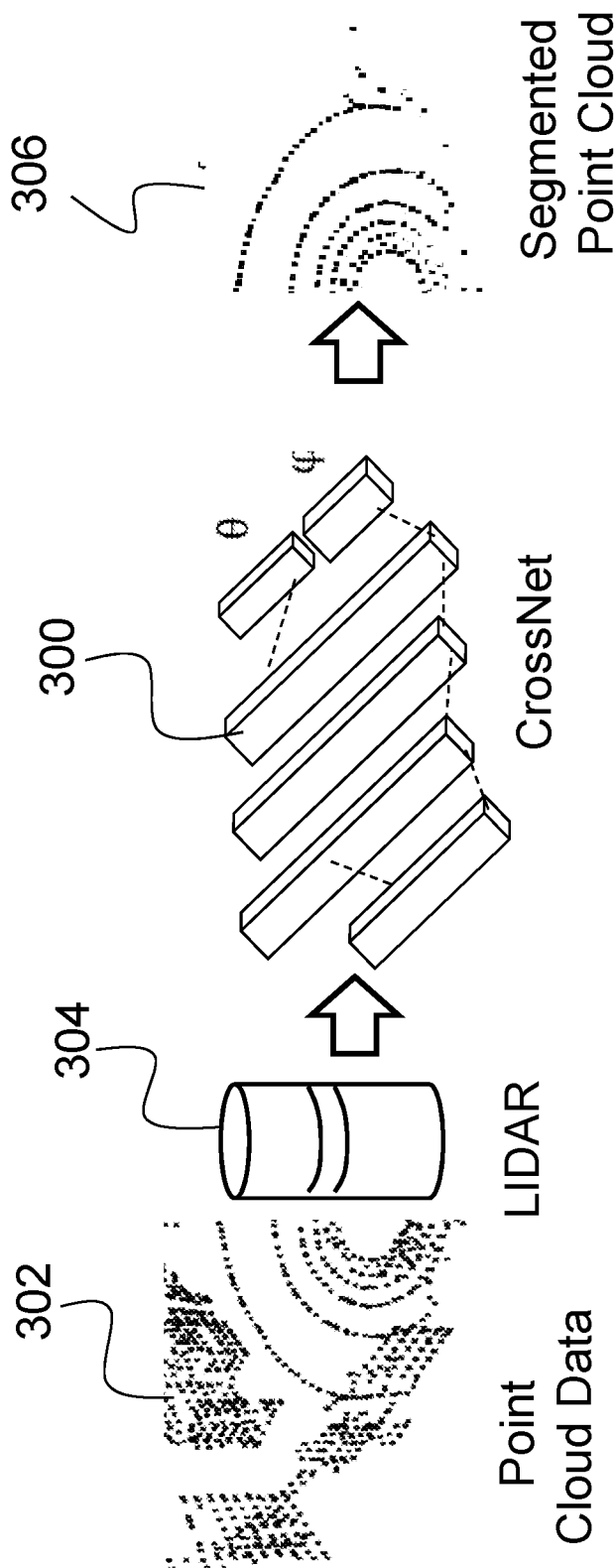
FIG. 3 is an illustration of ground-plane segmentation of point cloud data generated by a LIDAR sensor according to some embodiments of the present disclosure.

One embodiment of the invention described herein, referred to as "CrossNet", is concerned with estimating polar angle ($\theta$ in spherical coordinates) and azimuthal angle ($\varphi$ in spherical coordinates) of a patch of points sampled from a point cloud generated by a rotating LIDAR sensor or stereo camera sensor. FIG. 3 depicts the process of CrossNet 300 consuming point cloud data 302 generated by a LIDAR sensor 304 for segmentation into ground and non-ground plane (i.e., segmented point cloud 306).

Figure 4:
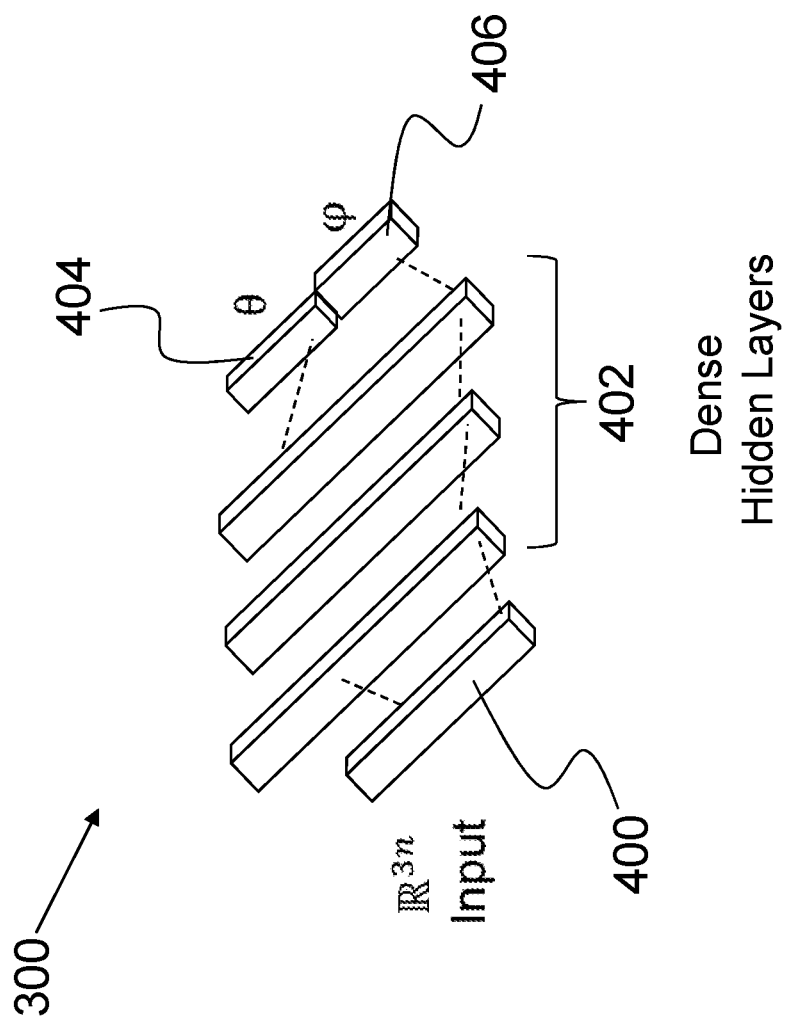
FIG. 4 is an illustration of a neural network architecture according to some embodiments of the present disclosure.

A second embodiment of the invention, referred to as "ThetaNet", is concerned with estimating only the polar angle $\theta$ of said patch of points. ThetaNet, an approach for training a neural network to perform pointwise surface normal estimation and ground-plane segmentation, trains a neural network f, to estimate features of local patches of points from three-dimensional point clouds. For a given point $x \in \mathbb{R}^3$, n-many points $X \in \mathbb{R}^{3n}$ of points within a radius r of x are sampled, preprocessed with a preprocessing function $\eta$, and finally provided as input to a neural network model for local feature estimation. The CrossNet 300 neural network architecture is illustrated in FIG. 4 with an input layer 400 in $\mathbb{R}^{3n}$, three densely connected hidden layers 402, and two outputs consisting of the polar angle θ 404 and azimuthal angle ϕ 406. In order to perform the application of segmenting and estimating features of point cloud data (e.g. of the type generated by LIDAR and stereo camera sensors), the invention must be provided with point cloud data of the form $\mathbb{R}^{3n}$ (i.e., inputs must be n-tuples of three floating point values where these values correspond to x-, y-, and z-coordinates of a point in Euclidean space). Additionally, during training, the invention must be provided with ground truth estimates of the surface normal for each point in the point cloud.

Figure 5:
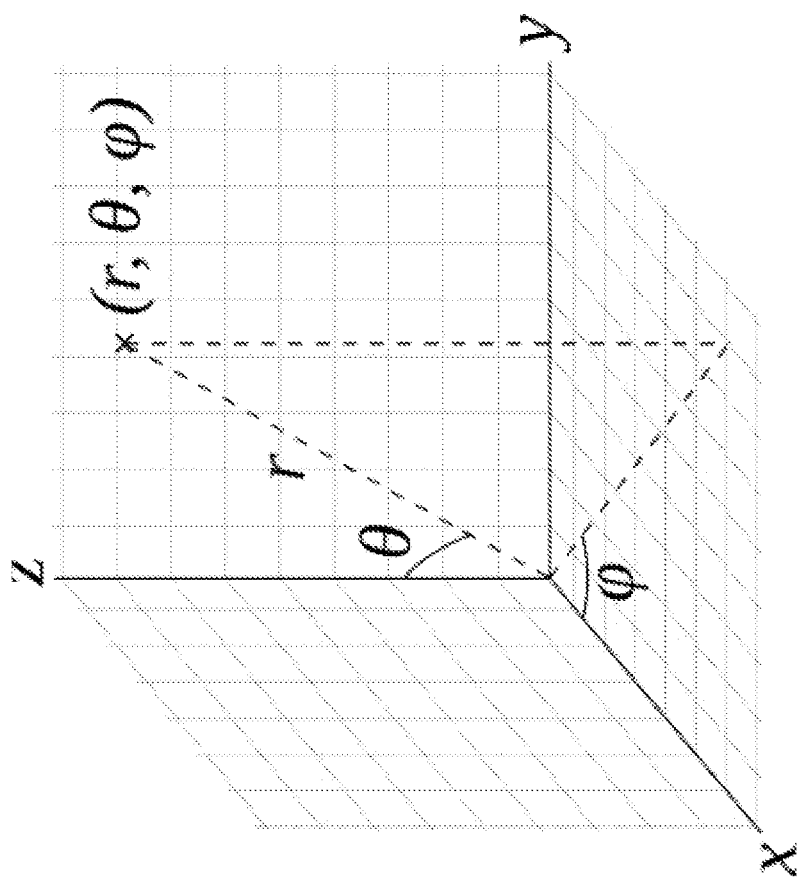
FIG. 5 is an illustration of spherical coordinates according to some embodiments of the present disclosure.

The invention described herein is constrained by the desire to operate in low power (e.g., ~0.6 watts), low cost, and thermally restricted or safety critical (and, therefore, requiring formal verification) applications which places hard constraints on the number of parameters of the model according to embodiments of the present disclosure. To provide this performance on a constrained computational budget, the invention reformulates the task to the estimation of either the polar angle θ and azimuthal angle ϕ, or simply the polar angle θ, of the surface normal of the central point of the sampled patch. The spherical coordinate convention utilized is shown in FIG. 5. Given an estimate of the surface normal f (η(X)), one can then simply set a threshold angle of deviation ϵ from the ground plane, where values below the threshold angle are classified as 'ground', and above the threshold angle are classified as 'non-ground'.

As the invention described herein can be used to train a neural network to perform ground-plane segmentation from LIDAR point cloud data via supervised learning, point cloud data with ground truth surface normal labels is required. In experimental studies, the data is gathered in simulation with Microsoft's AirSim autonomous vehicle simulation software. AirSim provides an autonomous vehicle simulation utilizing the NVIDIA PhysX vehicle dynamics model (developed by NVIDIA located at 2788 San Tomas Expressway, Santa Clara, CA 95051) with a full sensor suite including cameras, global positioning system (GPS), inertial measurement unit (IMU), and LIDAR packaged as a plugin to the 3D game engine Unreal Engine developed by Epic Games located at 620 Crossroads Blvd., Cary, NC 27518.

During training, the neural network is fed a batch of patches of n-many points with their associated ground truth labels and optimized with standard minibatch backprop. A patch is composed of the n−1 nearest neighbors of a point in the point cloud for which to estimate the polar angle of its surface normal. In practice, this angle is estimated for each point in the point cloud through other strategies, such as assigning this angle estimate to all points in a given patch. Each patch of n-many points, once sampled from the original point cloud, is then pre-processed with preprocessing function η before being presented to the network. η is a mapping of a patch of n-many points in cartesian coordinates $X \in \mathbb{R}^{3n}$ to a patch of n-many points in spherical coordinates $X' \in \mathbb{R}^{3n}$. The patch is first centered around its central point, though other approaches such as centering a patch around the mean point. The centered points are then converted from their cartesian representation to spherical coordinates. The radii of the points are then normalized relative to the patchwise sum of the radii. The points are presented to the neural network, sorted by their distance from the central point. No additional computational cost is created by calculating the k-many neighbors of a point compared to prior art, such as PCPNet or PointNet, as all three approaches require a radius search around each point of a LIDAR point cloud in practice. This preprocessing function η extracts the angular and distance relationship between the points surrounding the central point of a patch present in the cartesian point representation, effectively offloading the learning of this intermediate representation from the neural network.

In practice, generalization from AirSim simulation to real world LIDAR platforms is achieved by voxel based downsampling of the LIDAR point cloud before patches are sampled and preprocessed. Voxel based downsampling serves to bring the distribution of points closer to that of the training set, reduces the number of points for which surface normals must be estimated, and reduces the noise present in real world sensor data by replacing the points present in a voxel either by a single representative point selected at random or their mean. The final ThetaNet model, trained only in simulation, was utilized and demonstrated on both a remote control (RC) car platform utilizing the Velodyne Puck LITE VLP-16 LIDAR sensor with 16 'rings' and an autonomous vehicle platform, the Polaris MRZR utilizing the Velodyne HDL-32E LIDAR sensor with 32 'rings'). Both of these vehicle demonstrations provided comparable performance to that observed in simulation. Velodyne Lidar is located at 5521 Hellyer Avenue, San Jose, CA 95138. Furthermore, experimental studies indicated successful formal verification of properties of the resulting network.

In summary, the invention described herein utilizes a neural network model of 10k parameters (or less), surpasses the cost, computation, and energy savings of prior art (e.g., Literature Reference No. 5), which still requires a GPU, albeit a lower cost embedded model, by not requiring any GPU whatsoever. Further, the work described in Literature Reference No. 5 does not estimate surface normals and only provides point cloud segmentation. The invention according to embodiments of the present disclosure provides both surface normal estimation and utilizes these estimates to provide point cloud segmentation into ground and non-ground plane points. While the work of Literature Reference No. 1 could similarly be used to segment point clouds into ground and non-ground plane points given the surface normals, the invention described herein achieves the same goal with only 10k parameters versus the 3.5M parameters in the model disclosed in Literature Reference No. 1. The work of Literature Reference No. 3 does not provide surface normal estimation, though it does provide point cloud segmentation. However, as previously noted by Literature Reference No. 5, the work of Literature Reference No. 3 does not perform well in outdoor environments, which are exactly the type of environments in which many land, air, and underwater autonomous systems intend to operate.

Figure 6:
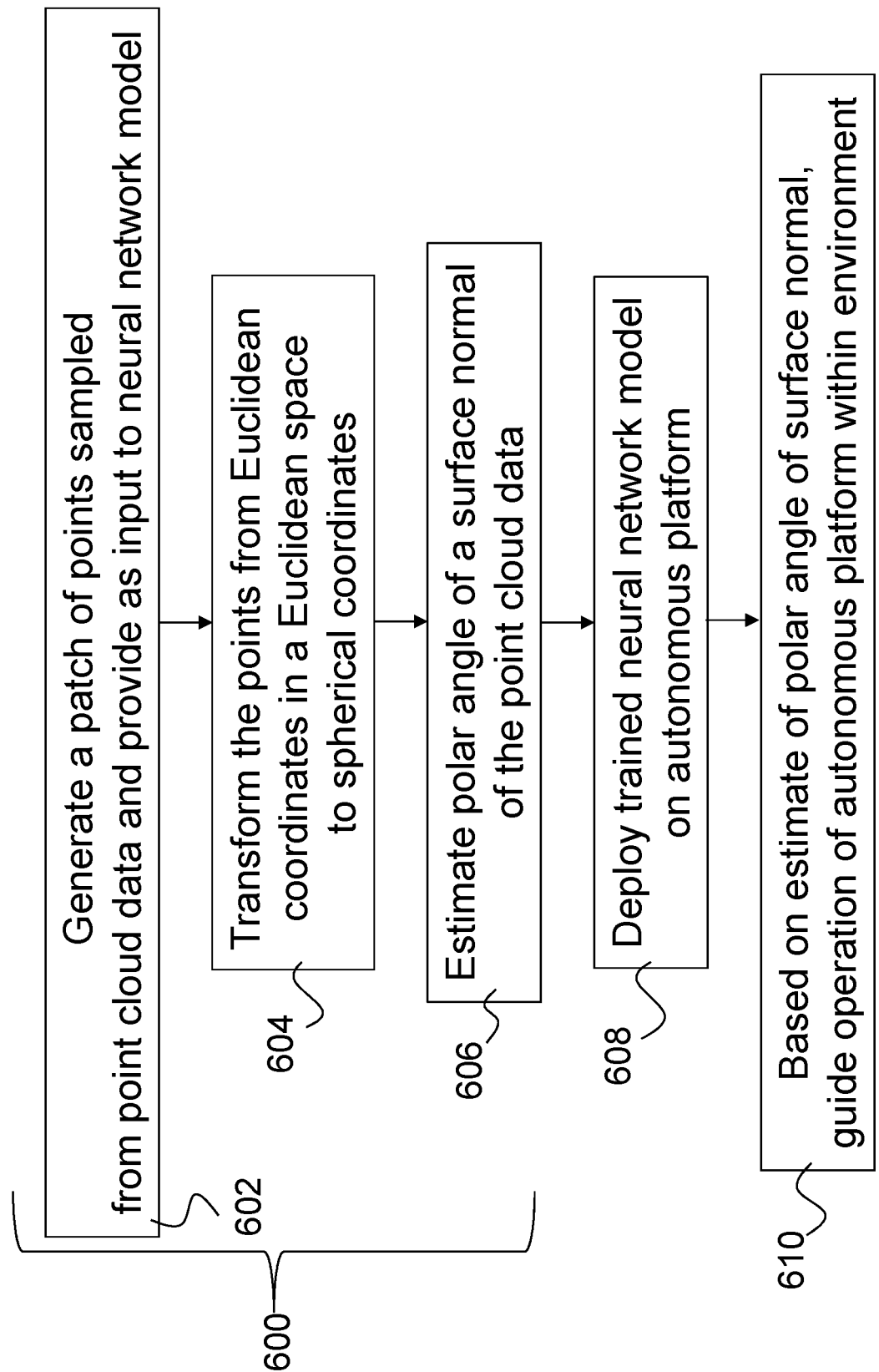
FIG. 6 is a flow diagram illustration a system for estimating surface normals for use in operating an autonomous platform according to some embodiments of the present disclosure.

FIG. 6 is a flow diagram illustration a system for operating an autonomous platform in an environment using information extracted from point cloud data in the environment. As described above, a neural network model is trained (element 600), where a patch of points sampled from the point cloud data is provided as input to the neural network model using parallelizable k-nearest neighbor sorting algorithms (element 602). The points are transformed from Euclidean coordinates in terms of (x, y, z) in a Euclidean space to spherical coordinates in terms of (r, ϕ, θ) in a spherical space (element 604). Then, a polar angle of a surface normal of the point cloud data is estimated in the spherical space (element 606). The trained neural network model is deployed on the autonomous platform (element 608). The estimate of the polar angle of the surface normal provides guidance for operation of the autonomous platform within the environment (element 610) for safe and successful operation of the autonomous platform. Safe and successful operation requires prevention of vehicle/platform collisions and rollovers. Additionally, successful operation requires establishing a trajectory to enable the autonomous platform to operate and maneuver within the environment.

The system can be embedded in and deployed in assisted operation vehicles with human operators and autonomous platforms, such as unmanned aerial vehicles (UAVs), unmanned ground vehicles (UGVs), underwater autonomous platforms, and self-driving vehicles. For instance, in an autonomous ground vehicle, the system can be used for determining a trajectory to operate and maneuver within the environment. Based on the estimated surface normals, the system can control a vehicle component, such as a throttle/brake, acceleration/deceleration controls, a steering mechanism, suspension, or safety device (e.g., airbags, seatbelt tensioners, etc.), or any combination thereof, in order to safely and effectively maneuver within the environment. Additionally, in real-time, as the autonomous platform progresses through an environment, the estimated surface normals can be used in generation of an alert sent to a vehicle operating system (or a human user). The alert can be a visual alert (e.g., a message displayed on a screen), an auditory alert (e.g., beeping), or any combination thereof. Moreover, an alert can be generated in conjunction with control of a vehicle component, causing the vehicle to brake, steer, or otherwise adhere to the alert. The system may also be configured to perform a vehicle operation through direct control of steering, braking, or throttle controls rather than providing an alert to a human or another mechanical system.

This invention applies to any program or product line that utilizes point cloud data, non-limiting examples of which include autonomous or semi-autonomous vehicle platforms that utilize LIDAR or stereo camera systems. For instance, the invention described herein has been successfully deployed and demonstrated on a land based autonomous vehicle, specifically a Polaris MRZR. For instance, the slope estimation can be used to determine impassable terrain, or estimate a "cost" for entering terrain, based on the capabilities and mission of the vehicle, to be utilized by the vehicle path planning system. The slope estimation can also be fused with other sensor inputs (e.g., camera, radar) and utilized in a similar manner by the vehicle path planning system (i.e., path planner).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for operating an autonomous platform in an environment using information extracted from point cloud data in the environment, the system comprising:
   a sensor generating point cloud data; and
   one or more processors and a non-transitory computer-readable medium having executable instructions encoded thereon such that when executed, the one or more processors perform operations of:
   training a neural network model with imageless data, the imageless data being exclusively the point cloud data, comprising:
   using a parallelizable k-nearest neighbor sorting algorithm, providing a patch of points sampled from the point cloud data as input to the neural network model, wherein the patch of points has a central point;
   transforming the patch of points from Euclidean coordinates in a Euclidean space to spherical coordinates; and
   generating normalized points by projection onto the unit sphere;
   estimating a polar angle of a surface normal of the normalized points in the spherical coordinates;
   utilizing the trained neural network model on the autonomous platform; and
   using the estimate of the polar angle of the surface normal to guide operation of the autonomous platform within the environment.

2. The system as set forth in claim 1, wherein the one or more processors further perform an operation of estimating an azimuthal angle of the surface normal in the spherical coordinates.

3. The system as set forth in claim 1, wherein the one or more processors further perform operations of:
   extracting an angular and distance relationship between points in the patch and the central point; and
   providing the angular and distance relationship as input to the neural network model.

4. The system as set forth in claim 1, wherein the neural network model is used to estimate whether the point cloud data corresponds to ground data or non-ground data.

5. The system as set forth in claim 1, wherein the autonomous platform is an autonomous ground vehicle, and wherein operating the autonomous ground vehicle within the environment comprises controlling a vehicle component of the autonomous ground vehicle.

6. A computer implemented method for operating an autonomous platform in an environment using information extracted from point cloud data in the environment, the method comprising an act of:
   causing one or more processors to execute instructions encoded on one or more associated memories, each associated memory being a non-transitory computer-readable medium, such that upon execution, the one or more processors perform operations of:
   training a neural network model with imageless data, the imageless data being exclusively the point cloud data, comprising:
   using a parallelizable k-nearest neighbor sorting algorithm, providing a patch of points sampled from the point cloud data as input to the neural network model, wherein the patch of points has a central point;
   transforming the patch of points from Euclidean coordinates in a Euclidean space to spherical coordinates; and
   generating normalized points by projection onto the unit sphere;
   estimating a polar angle of a surface normal of the normalized points in the spherical coordinates;

utilizing the trained neural network model on the autonomous platform; and using the estimate of the polar angle of the surface normal to guide operation of the autonomous platform within the environment.

7. The method as set forth in claim 6, wherein the one or more processors further perform an operation of estimating an azimuthal angle of the surface normal in the spherical coordinates.

8. The method as set forth in claim 6, wherein the one or more processors further perform operations of:

extracting an angular and distance relationship between points in the patch and the central point; and providing the angular and distance relationship as input to the neural network model.

9. The method as set forth in claim 6, wherein the neural network model is used to estimate whether the point cloud data corresponds to ground data or non-ground data.

10. The method as set forth in claim 6, wherein the autonomous platform is an autonomous ground vehicle, and wherein operating the autonomous ground vehicle within the environment comprises controlling a vehicle component of the autonomous ground vehicle.

11. A computer program product for operating an autonomous platform in an environment using information extracted from point cloud data in the environment, the computer program product comprising:

computer-readable instructions stored on a non-transitory computer-readable medium that are executable by a computer having one or more processors for causing the processor to perform operations of:

training a neural network model with imageless data, the imageless data being exclusively the point cloud data, comprising:

using a parallelizable k-nearest neighbor sorting algorithm, providing a patch of points sampled from the point cloud data as input to the neural network model, wherein the patch of points has a central point;

transforming the patch of points from Euclidean coordinates in a Euclidean space to spherical coordinates; and generating normalized points by projection onto the unit sphere;

estimating a polar angle of a surface normal of the normalized points in the spherical coordinates;

utilizing the trained neural network model on the autonomous platform; and using the estimate of the polar angle of the surface normal to guide operation of the autonomous platform within the environment.

12. The computer program product as set forth in claim 11, wherein the one or more processors further perform an operation of estimating an azimuthal angle of the surface normal in the spherical coordinates.

13. The computer program product as set forth in claim 11, wherein the one or more processors further perform operations of:

extracting an angular and distance relationship between points in the patch and the central point; and providing the angular and distance relationship as input to the neural network model.

14. The computer program product as set forth in claim 11, wherein the neural network model is used to estimate whether the point cloud data corresponds to ground data or non-ground data.

15. The computer program product as set forth in claim 11, wherein the autonomous platform is an autonomous ground vehicle, and wherein operating the autonomous ground vehicle within the environment comprises controlling a vehicle component of the autonomous ground vehicle.

* * * * *